Figure 8:
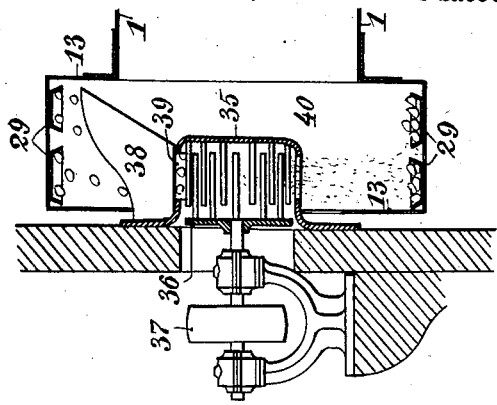

Jan. 11, 1927. 1,614,364
G. HIDOUX
COMBINED DRYING AND GRINDING MACHINE FOR CLAY AND OTHER PLASTIC MATERIALS
Filed Feb. 14, 1924 4 Sheets-Sheet 1
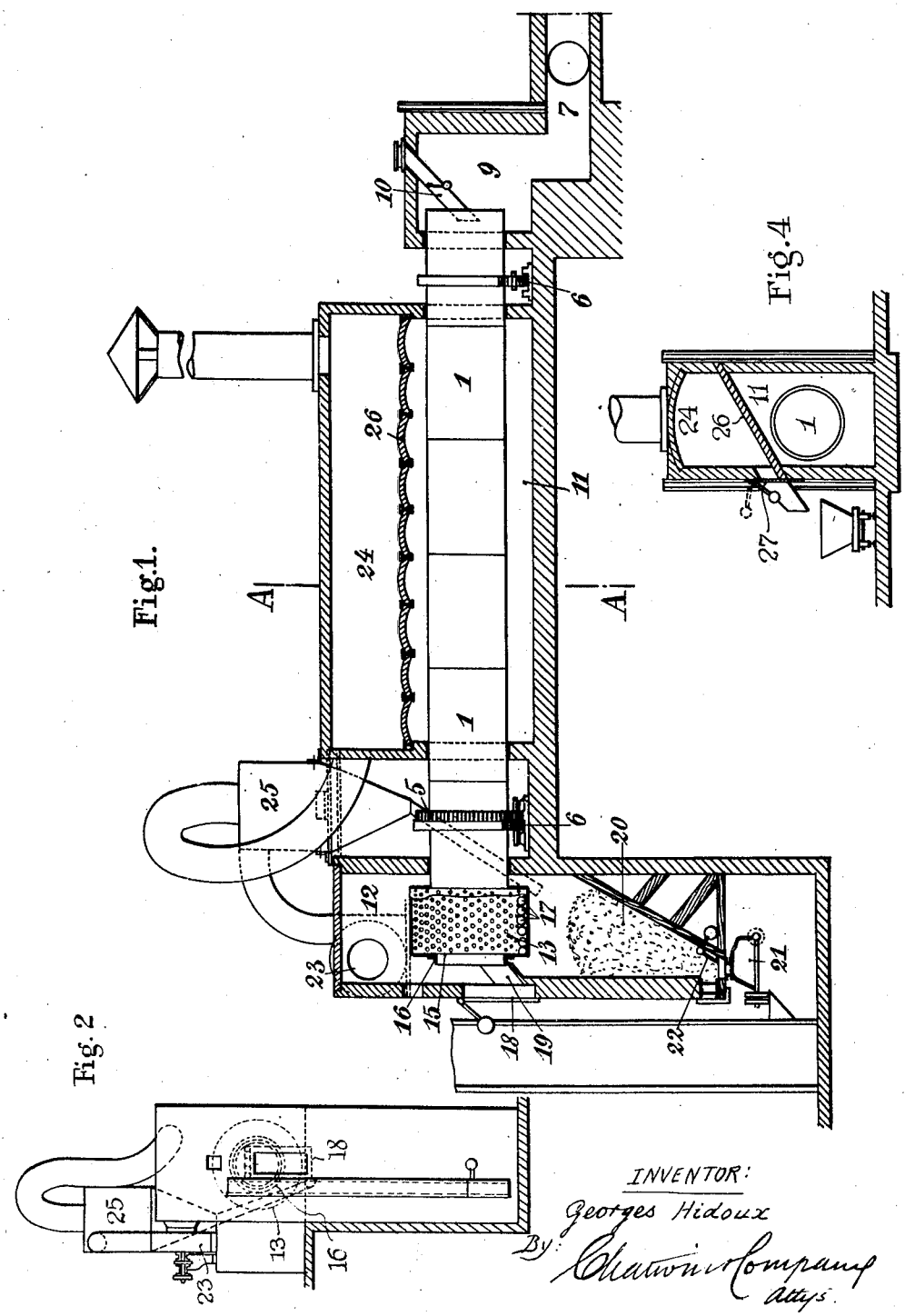
INVENTOR:
Georges Hidoux
By Chatwin Company
attys.

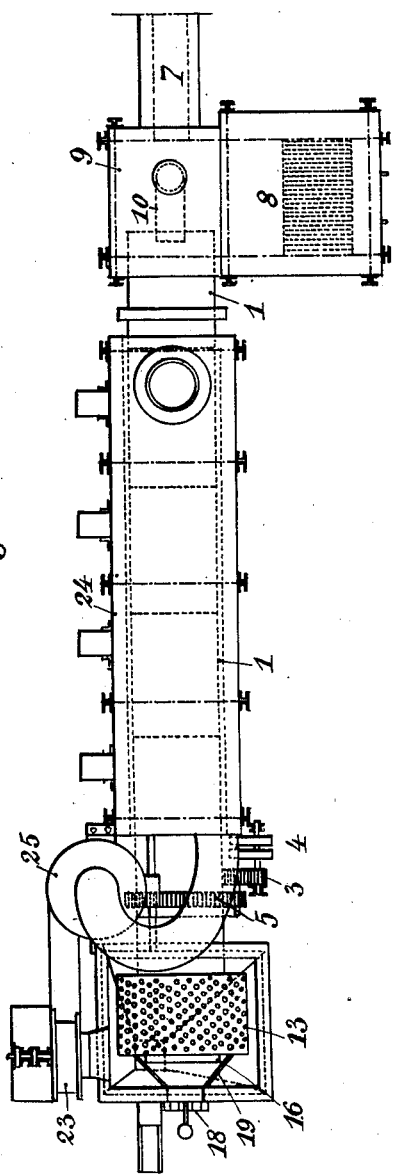

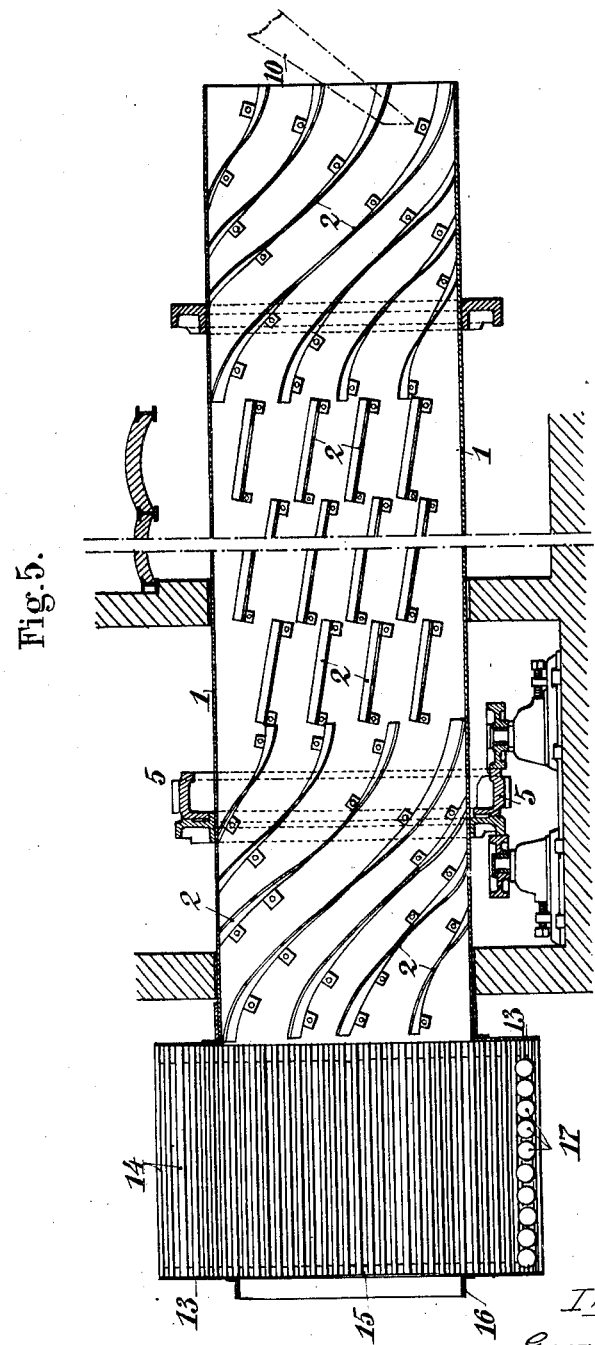

Jan. 11, 1927.

G. HIDOUX 1,614,364

COMBINED DRYING AND GRINDING MACHINE FOR CLAY AND OTHER PLASTIC MATERIALS

Filed Feb. 14, 1924     4 Sheets-Sheet 4

INVENTOR:
Georges Hidoux.
By: Chalson & Company
Attys.

Patented Jan. 11, 1927.

1,614,364

UNITED STATES PATENT OFFICE.

GEORGES HIDOUX, OF ST.-DENIS, FRANCE, ASSIGNOR TO SOCIÉTÉ D'EXPLOITATION DES PROCÉDÉS HIDOUX, OF ST.-DENIS, FRANCE, A COMPANY ORGANIZED UNDER FRENCH LAW.

COMBINED DRYING AND GRINDING MACHINE FOR CLAY AND OTHER PLASTIC MATERIALS.

Application filed February 14, 1924, Serial No. 692,908, and in France February 24, 1923.

Clay and other plastic materials destined to be made into moulded articles, such as bricks, tiles, paving blocks and the like, are sometimes first dried and pulverized and then subjected to a moistening convenient for moulding, or water may be added to the pulverized matter to produce a paste. The latter method requires very thorough grinding of the material to counteract the presence of undesirable substances as lime, chalk, silica, iron oxide and so forth. In both cases however, it is necessary to eliminate at some stage the unbreakable ingredients such as pieces of rock, stone, metal ore, or even fragments of artillery shells which have become incorporated in the mass and would damage the machinery in subsequent operations.

To this end the wet clay after being broken up is fed into a rotary drier and then pulverized in a grinder which may operate in any convenient manner such as with beaters, rods, balls or the like. It has been found that the plastic material, and especially clay, are more or less dried in the rotary drier according to their size and thus the larger fragments tend to clog the grinder and cause delay for cleaning purposes which renders the process both tedious and costly.

The present invention overcomes these disadvantages by providing a combined drier and grinder wherein the larger fragments are subjected to prolonged drying or, together with the ungrindable substances, are ejected from the apparatus, whilst material in the desired state of disintegration is passed through.

Figure 7:
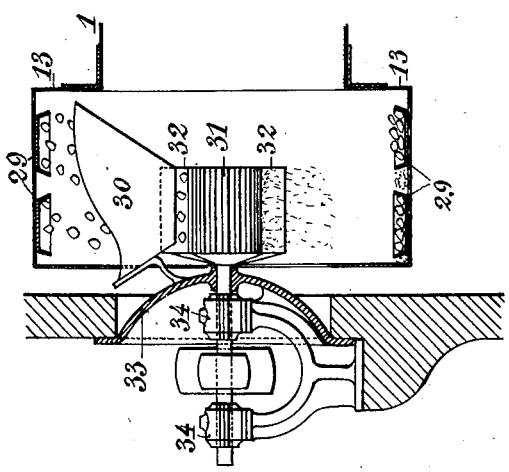
Figure 6:
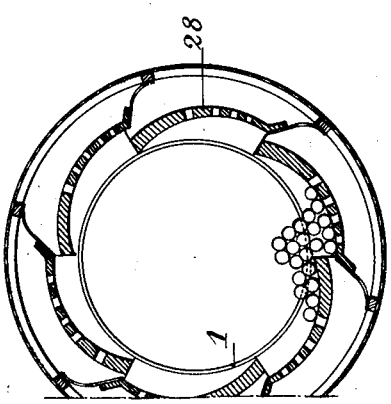

The accompanying drawings forming part of this specification illustrate an embodiment of the invention. In the drawings:

Figure 1 shows a drier and grinder partly in vertical section; Fig. 2 is an end view thereof; Fig. 3 is a plan of same; Fig. 4 is a transverse sectional view on line A—A of Fig. 1; Fig. 5 shows in detail a drying tube and grinding drum in vertical section; Fig. 6 represents in transverse section the application of a blade grinder for pellets to the drying tube; Fig. 7 shows a combined grinder drum and disintegrator partly in vertical section, and Fig. 8 shows a grinder with fixed and moving pins applied to the drum head.

Referring to the drawings, the drier consists of a tube 1 having a number of blades 2 suitably disposed upon its inner periphery and shaped to ensure the advancement and thorough tumbling of the material to be dried on rotating the tube. It will be noticed on reference to Fig. 3 that the blades 2 are not necessarily in the form of a continuous spiral, but are arranged in broken or staggered formation to assist in dividing the material. The rotation is effected by a train of pinions 3 (Fig. 3) driven from pulleys 4 and in gear with the toothed ring 5 secured around the exterior of the tube 1. The latter is supported by rollers 6 carried on adjustable footsteps and running on tracks provided on the ring.

Hot gases for drying the material are furnished by the waste gases from steam boilers entering by the passage 7 or by a gas or other fire 8 (Fig. 3) or by gas or oil burners, or by any other generator of hot gas or air. These hot gases pass into the mixing chamber 9 at the mouth of the tube 1 and entering said tube travel over and as the tube rotates come into intimate contact with the material, continually fed thereto by the chute 10.

The drying tube 1 is preferably enclosed by a brick or the like chamber 11, chiefly to prevent cooling by the external air, but also serving for re-heating the tube. The head of the tube enters a second chamber 12 where the steam escapes, the arrangement giving the necessary clearance between the tube 1 and the vertical walls.

The grinder comprises a drum-head 13 preferably of larger diameter than the drying tube to which it is fixed and forms an extension within the chamber 12. The rotation of the table is thus transmitted to the grinder without necessitating a shaft or other driving gear. The peripheral wall of the drum is made up of removable perforated plates as in Figs. 1 and 3, removable barred gratings, or round rods 14 (Fig. 5) secured between two plates, the rods or bars being disposed horizontally or obliquely, parallel, crossed or in any other desired manner.

The end plates of the drum-head are annular in form, the diameter of the opening 15 being designed to provide an annular space between the walls of the drum to contain the material for grinding previously dried in the tube 1. The circular orifice 15 has a collar 16 and the grinder is completed by a number of balls 17 placed within the drum in the ordinary manner for breaking up the material fed from the drying tube. Material insufficiently dried and consequently difficult to divide is kept above the balls where it continues to dry. This special arrangement enables parts not sufficiently dried in the tube to be maintained in contact with the hot gases until they attain the proper degree of dryness for their fragmentation.

The desiccation is assisted by the hot balls and other moving parts in frictional contact with the material, and should the gases be unsaturated their passage through the apparatus may be controlled by means of a ventilator. A supplementary fire or other source of heat may assist in raising the temperature in the final chamber. Moreover the heating of the sieve by the gases prevents the clogging thereof which would otherwise occur.

For certain materials less adhesive than damp clay the arrangement of the various parts may be modified to effect systematic drying. However, when using adhesive material such as ordinary clay careful adjustment of the heat is not so necessary, the walls being allowed to become hot so that clay which tends to cake is considerably heated by said walls.

The chamber 12 has a door 18 facing the drum opening 15, counterbalanced by a spring or weight and adapted to be opened automatically by the pressure of unbroken or excess matter due to a surcharge of the drum, said matter overflowing the collar 16 and passing down the inclined chute 19.

The broken material, passing through the perforations or bars of the drum, falls into a hopper 20 whence it may be continuously removed by a screw or other conveyor, or stored and removed when desired by a distributor 21. The hopper is closed by a counterpoised flap 22 to prevent the ingress of air when empty.

A ventilator fan 23 in the upper portion of the chamber 12 circulates the hot gas and steam and drives them directly to the dust chamber 24 or into an intermediate whirl chamber 25. As seen in Fig. 4 the dust chamber 24 is disposed above the heat retaining chamber 11 and the partition 26 separating the two chambers 11 and 24 is inclined so that dust deposited in the chamber 24 will be caused by gravity to pass out by the weighted doors 27 into the trucks thereberneath.

In order to take up the weight of the drum head one or more rails may be provided running over rollers preferably supported upon a pedestal outside the chamber 12 on the side nearest the flue.

The chamber 12 may comprise several compartments dividing the ventilation tube 23 in order to effect a primary separation of the dust before the steam and gas are removed by the fan. The drum-head balls may be replaced by stones, those in excess being continuously or intermittently ejected by the door 18. Also the drum 13 can be made of two portions, one of larger diameter than the other, which latter may be the same diameter as the tube 1 to which it is attached. The inner portion may pass only the smaller drier particles to the outer sieve in which the balls complete a thorough breaking up of the material.

Many different qualities may thus be obtained by the sieves according to the type and size of mesh used and the degree of elimination of stones and dust. The operation may be temporarily interrupted for cleaning the grinding compartment, sorting the material therein, or replenishing the balls.

The drum-head may have a number of perforated vanes 28 (Fig. 6) forming an inner sieve and ball grinder within an outer sieve. Again, cups 29 (Fig. 7) may be disposed around a drum of the sieve or grating type which in this case does not contain balls so that unground material may be carried round and deposited into the hopper 30 and falls between the two cylinders 31 and 32 of a disintegrator. The hopper 30 is fixed upon a dished cover 33 through which pass the shafts of the disintegrator cylinders. These shafts are mounted in pedestal bearing 34 externally of chamber 12 and operated by any means which will ensure rotation of the cylinders.

The disintegrator may, however, be in the form of a beater comprising two moving plates, or as shown in Fig. 6, a plate or casing 35 fixed to the wall and a plate 36 rotated by pulley 37 or toothed gearing, each being provided with a number of rods or beaters. A hopper 38 fixed to the upper part of casing 35 receives the material deposited by the cups 29 and passes it through an opening 39 into the casing where it is well broken by the rods before leaving by the lower opening 40. The disintegrator may be steam jacketed to increase the temperature and to avoid the risk of clogging of the device.

The drum-head used without balls need not have an outside collar for the over-flow as in this type the larger lumps of clay which are least dry fall into a pounder having beaters, rotating or stationary cylinders, teeth or rods. If desired the material may be returned by a conveyor or the like to feeding chute for further drying and disintegration, and it is evident that various modifications could be made in various details of construction, dimensions and accessories without departing from the spirit of the invention.

I claim:

1. Combined drier and grinder comprising a rotatable drying tube, means for feeding into one end of said tube material to be treated, a drum containing grinding means on the other end of said tube, the peripheral wall of said drum being perforated to form a sieve for the delivery therethrough of the dried and ground material, means for supplying hot gases to said tube and drum and means for retaining within said drum insufficiently ground and desiccated material.

2. Combined drier and grinder comprising a rotatable drying tube, means for feeding the material to be treated into one end of said tube, a drum containing grinding means on the other end of said tube, the peripheral wall of said drum being perforated to form a sieve for the delivery therethrough of the dried and ground material, means for supplying hot gases to said tube and drum, and an annular end plate on said drum, as and for the purpose set forth.

3. Combined drier and grinder comprising a rotatable drying tube, means for feeding the material to be treated into one end of said tube, a drum containing grinding means on the other end of said tube, the peripheral wall of said drum being perforated to form a sieve for the delivery therethrough of the dried and ground material, means for supplying hot gases to said tube and drum, an annular end plate on said drum, a heat-retaining chamber around said tube, a dust chamber above said heat-retaining chamber and separated therefrom by a sloping floor, and a chamber connecting the exit of the drying tube with the dust chamber, as and for the purpose set forth.

4. Combined drier and grinder comprising a rotatable drying tube, means for feeding the material to be treated into one end of the said tube, a drum containing grinding means on the other end of said tube, the peripheral wall of said drum being perforated to form a sieve for the delivery therethrough of the dried and ground material, means for supplying hot gases to said tube and drum, an annular end plate on said drum, a heat-retaining chamber around said tube, a dust chamber above said heat-retaining chamber and separated therefrom by a sloping floor, and a whirl chamber interposed between the drying tube and the dust chamber, as and for the purpose set forth.

5. Combined drier and grinder comprising a rotatable drying tube, means for feeding the material to be treated into the end of said tube, a drum on the other end of said tube, the peripheral wall of said drum being perforated to form a sieve, an inner sieve consisting of a plurality of perforated vanes within said drum, grinding means within said inner sieve, means for supplying hot gases to said tube and drum, and an annular end plate on said drum, as and for the purpose set forth.

6. Combined drier and grinder comprising a rotatable drying tube, means for feeding the material to be treated into the end of said tube, a drum on the other end of said tube, the peripheral wall of said drum being perforated to form a sieve for the delivery therethrough of the dried and ground material, a disintegrator within the drum, a hopper therefor, means on the drum for feeding material therein to the hopper, means for supplying hot gases to said tube and drum, and an annular end plate on said drum, as and for the purpose set forth.

GEORGES HIDOUX.